United States Patent [19]

Fujiki

[11] Patent Number: 4,539,607
[45] Date of Patent: Sep. 3, 1985

[54] SERVO TRACK CONFIGURATION FOR MAGNETIC DISK APPARATUS

[75] Inventor: Masao Fujiki, Tokyo, Japan

[73] Assignee: Tokyo Shibaura Denki Kabushiki Kaisha, Kawasaki, Japan

[21] Appl. No.: 426,757

[22] Filed: Sep. 29, 1982

[30] Foreign Application Priority Data

Oct. 12, 1981 [JP] Japan .............................. 56-160956

[51] Int. Cl.³ .............................................. G11B 5/48
[52] U.S. Cl. .......................................... 360/77; 360/78
[58] Field of Search ............................. 360/77, 78, 135

[56] References Cited

U.S. PATENT DOCUMENTS

| 3,593,333 | 7/1971 | Oswald | 360/77 |
| 4,087,843 | 5/1978 | Louis et al. | 360/78 |
| 4,208,679 | 6/1980 | Hertrich | 360/77 |
| 4,238,809 | 12/1980 | Fujiki et al. | 360/131 |

Primary Examiner—George G. Stellar
Attorney, Agent, or Firm—Cushman, Darby and Cushman

[57] ABSTRACT

A servo track configuration has a plurality of magnetized unit regions provided on the servo sectors of a magnetic disk so that they may be sequentially disposed in four positions predetermined on the servo tracks at prescribed space intervals from each other, the magnetized unit regions at each position being spaced apart from each other at space intervals equal to two-track width and each having a length of two-track width. The disposition of said magnetized unit regions provided in said four positions is made such that when one magnetized unit region is taken as a reference, the remaining are disposed sequentially shifted by one-track width from said one magnetized unit region in one direction.

4 Claims, 14 Drawing Figures

SERVO TRACK CONFIGURATION FOR MAGNETIC DISK APPARATUS

BACKGROUND OF THE INVENTION

This invention relates to a servo track configuration for magnetic disk apparatus.

In recent years, a small sized magnetic disk apparatus is arranged such that data sectors for storage of data signals and servo sectors for storage of servo signals co-exist on the magnetic disk surface for effective utilization of the same without using a servo data surface for exclusive use in the positioning of a magnetic head as in the case of a large sized magnetic disk apparatus. The data sectors and servo sectors are alternately disposed on the magnetic disk surface provided with a plurality of tracks. If, in a state wherein the magnetic head is radially movably is close proximity to the magnetic disk surface, the magnetic disk is rotated, the magnetic head produces a signal obtained from the servo signal or data signal written on the track corresponding to the position at which the magnetic head is located. Since the signals from the servo sectors are intermittently produced from the magnetic head, the servo sectors are provided thirty or more in number for obtaining stable and detailed information as to the position of the magnetic head.

When it is desired to move the magnetic head onto a predetermined track, the difference between the track on which the magnetic head is currently located and a predetermined track onto which the magnetic head is to be moved (that is, the number of tracks to be passed over by the magnetic head) is supplied to a suitable servo device. When the number of tracks to be passed is not "0", the magnetic head is caused to move. Each time the magnetic head goes across a track, one is subtracted from the number of tracks to be passed over. When this track number has become "0", the moving operation for the magnetic head is stopped. In order to detect whether or not the magnetic head has gone across a track, use is made of an output signal obtained from the magnetic head when the same passes over the servo signal written on the tracks. By subjecting this output signal to arithmetic operation, a position signal indicating the current position of the magnetic head is obtained. When the magnetic head is situated, in its entirety, on one track, the output signal is "0". When the magnetic head is radially displaced from a position corresponding to said one track on which it is currently located, the output signal becomes positive or negative. When the magnetic head is located at a middle position between said one track and a track adjacent thereto, the output signal obtains a positive or negative maximal value. And when the magnetic head comes near an adjacent track, the position signal approaches to "0". Each time the magnetic head passes over the servo sector, the servo device checks the output signal and, by confirming that the output signal varies from a positive value to a negative value or vice versa, detects that the magnetic head radially crosses a track.

In the prior art, therefore, when the magnetic head radially moves over a zone of more than a onetrack width during its passing over of the data sector, the output signal often becomes positive from its positive level or negative from its negative level, it being thus no longer detected that the magnetic head has crossed a track. For this reason, it was necessary to limit the movement of the magnetic head so as to prevent the same from moving over more than a one-track width zone during its passing over of the data sector. This means imposing an upper limit upon the speed with which the magnetic head moves, thereby restricting any increase in operating speed of the magnetic disk apparatus.

SUMMARY OF THE INVENTION

The object of the invention is to provide a servo track configuration for magnetic disk apparatus which is provided on a servo section of a magnetic disk and which, when a magnetic head operating in cooperation with the magnetic disk radially moves above the magnetic disk, permits generation of an output signal determining the position of the magnetic head coming under the area of four-track width of movement thereof.

To achieve the above object, a servo track configuration of the invention provided on a servo sector of the magnetic disk having servo tracks is arranged such that magnetized unit regions each having a two-track width are respectively formed at first, second, third and fourth positions preselected on the servo tracks at prescribed space intervals from each other; and such that when the servo tracks are numbered sequentially from an outer peripheral one toward a central one so that they may have their numbers which sequentially increase from "0" and when the numbers of the servo tracks having a magnetized unit region disposed at said first position are assumed to be N and N+1, the numbers of the servo tracks having the magnetized unit regions disposed at said first, second, third and fourth positions are $N \pm 4n$, $N+1 \pm 4n$; $N+1 \pm 4n$, $N+2 \pm 4n$; $N+2 \pm 4n$, $N+3 \pm 4n$; and $N+3 \pm 4n$, $N+4 \pm 4n$ where n represents 0 or a positive integer.

The output signals delivered from the magnetic head on the basis of the action of a large number of the magnetized unit regions above disposed on the servo tracks each have a four-track width period of variation as seen from the above disposition relationship of the magnetized unit regions. And by using those output signals, it is possible to produce a two-phase signal capable of determining the position of the magnetic head within its moving area of four-track width. The technical detail of producing this two-phase signal will be described later in a description of the embodiment of the invention.

As stated above, according to the invention, the servo track configuration enables a determination of the position of the magnetic head within the four-track width of movement thereof. Therefore, insofar as the magnetic head does not move beyond the four-track width zone during its access to a data sector of the magnetic disk, no error is made in the signal representing the position of the magnetic head even when the velocity with which the magnetic head is moved is increased. Accordingly, it is not necessary that, as in the case of using the conventional servo track configuration, the movement of the magnetic head made during the passing thereof over the data sector be limited to that within one track width zone. This means that the servo track configuration of the present system has an effect of enabling a high degree of increase in the seek speed of the magnetic head.

DETAILED DESCRIPTION OF THE PREFERRED EMBODIMENT

Figure 1:
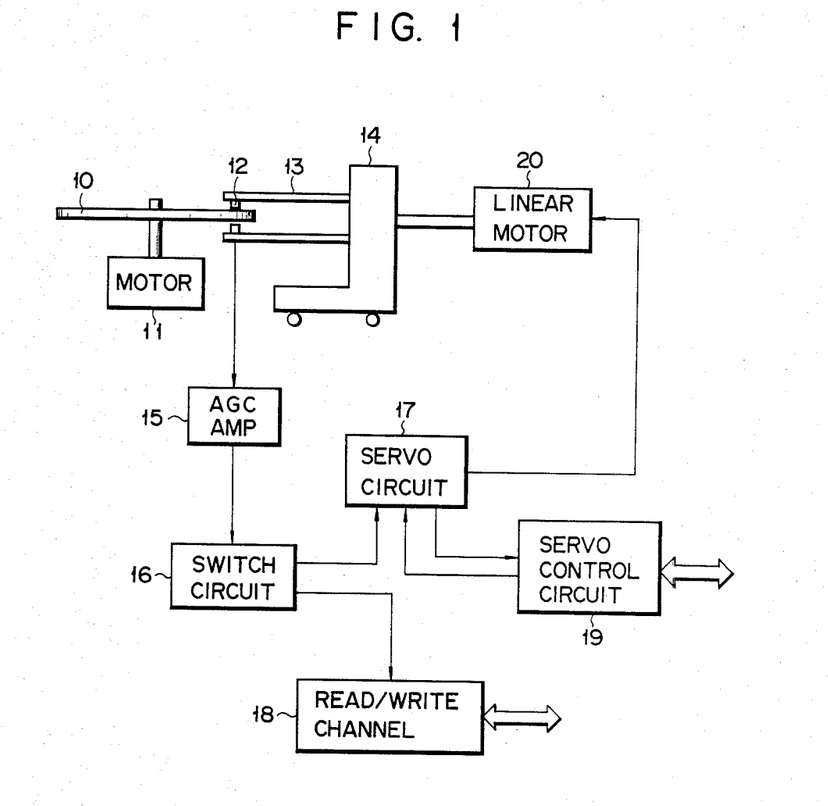
FIG. 1 is a block circuit diagram showing an example of a magnetic control system using a servo track configuration of this invention.
Figure 2:
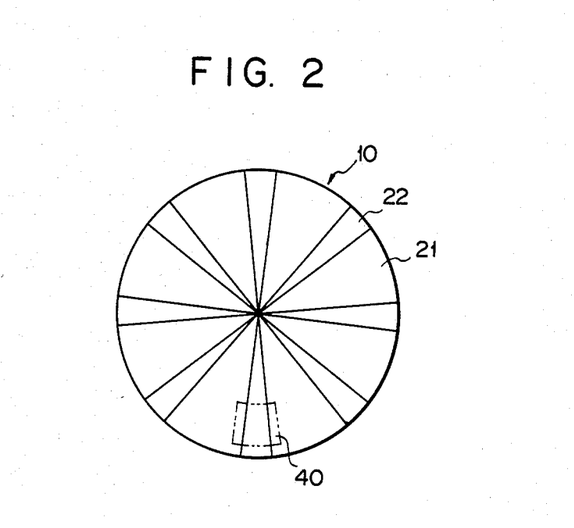
FIG. 2 is a view showing an example of the magnetic disk using the servo track configuration of this invention.

Hereinunder, a servo track configuration for magnetic disk apparatus according to an embodiment of the invention will be described with reference to the accompanying drawings. FIG. 1 is a block diagram showing the schematic construction of a magnetic disk apparatus based on the use of one magnetic disk using a servo track configuration according to the invention. A magnetic disk 10 is driven by a motor 11. A magnetic head 12 is provided on the tip end of an arm 13 attached to a carriage 14 driven by a linear actuator, for example, a linear motor 20. Reading/writing of data with respect to each side face of the magnetic disk 10 are effected by the action of the magnetic head 12. The magnetic disk 10 is often used by being piled up with two or more other such disks. As shown in FIG. 2, data sectors 21 and servo sectors 22 are alternately disposed on the magnetic disk 10. Usually, the servo sectors 22 are provided thirty or more in number on the magnetic disk surface. When the magnetic disk 10 is allowed to rotate, the magnetic head 12 reads data stored on the magnetic disk 10. The output signal from the magnetic head 12 is amplified by an AGC amplifier 15 having a function of automatic gain control and is then sent to a switch circuit 16. When the signal sent from the AGC amplifier 15 is a type read by the magnetic head 12 from the servo sector 22, the switch circuit 16 supplies that signal to a servo circuit 17. When that signal is a type read by the magnetic head from the data sector 21, the switch circuit 16 supplies that signal to a read/write channel 18. This read/write channel 18 separates the signal read by the magnetic head from the data sector 21, into a clock signal and a data signal, sending them to a disk controller not shown. The servo circuit 17 sends a drive current to the linear motor 20 so as to cause the magnetic head 12 to move to its designated track. This transmission of the drive current to the linear motor 20 from the servo circuit 17 is effected in accordance with an instruction signal applied from a servo control circuit 19 to the servo circuit 17 instructing the servo circuit 17 to move the magnetic head 12, and on the basis of the servo data read by the magnetic head 12 from the servo sector 22. The servo control circuit 19 receives, an instruction signal from the disk controller (not shown) instructing it to move the magnetic head 12 to a specified track. Further, the servo control circuit 19 receives a cylinder pulse signal supplied from the servo circuit 17. The cylinder pulse signal is an output signal produced from the servo circuit 17 when the same detects on the basis of the servo data that the magnetic head 12 has crossed a track. From the instruction signal supplied from the disk controller and this cylinder pulse signal, the servo control circuit 19 determines the difference between the track on which the magnetic head 12 is currently located and a track position to which the magnetic head 12 is to move, i.e., the number of the tracks over which the magnetic head 12 is to pass. Thus, the servo control circuit 19, as stated above, applies to the servo circuit 17, in the form of an instruction signal, the number of tracks to be passed over by the magnetic head 12.

Figure 3:
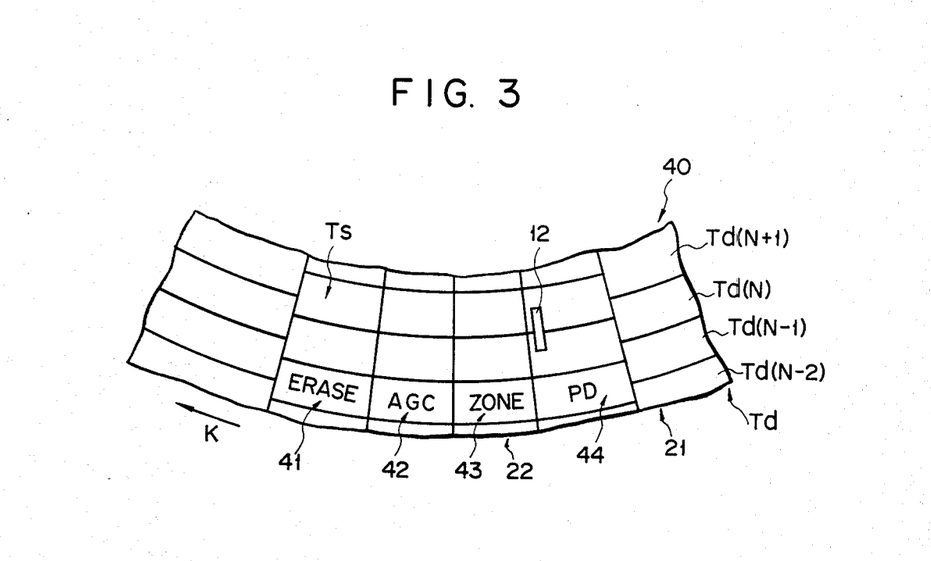
FIG. 3 is a view showing a part of an outer side portion of the magnetic disk of FIG. 2.

FIG. 3 schematically shows the positional relation of the data sector 21 with the servo sector 22. The illustration of FIG. 3 corresponds to a sectional two-dotted chain line enclosed portion (40) given on the surface of the magnetic disk 10 shown in FIG. 2. The data sector 21 is provided with a large number of data tracks Td having the same width. The data track Td(N) which is given an alphabetic reference N means that it is the Nth data track counted from the outer peripheral side of the magnetic disk 10 toward the center thereof. The manner in which the track number is assigned in other Figures is the same as in FIG. 3. The servo sector 22 is provided with a large number of servo tracks Ts having the same width as that of the data tracks and shifted by a half-track width from the same. It is to be noted here that the width of a core of the magnetic head 12 shown in FIG. 3 is substantially equal to the width of the tracks Td and Ts. When the magnetic head 12 reads/writes data from/into the data track Td, it overlaps, in its entirety, upon the data track Td over the entire width thereof during its passing over of the data sector 21, and the center of the magnetic head 12 is located on a border line between two adjacent servo tracks Ts during its passing over of the servo sector 22. The servo sector 22 is divided into four sections—ERASE section 41, AGC section 42, ZONE section 43 and POSITION DATA section i.e., PD section 44 in that order from the left of FIG. 3. The arrow K denotes the direction of rotation of the magnetic disk 10.

Figure 4:
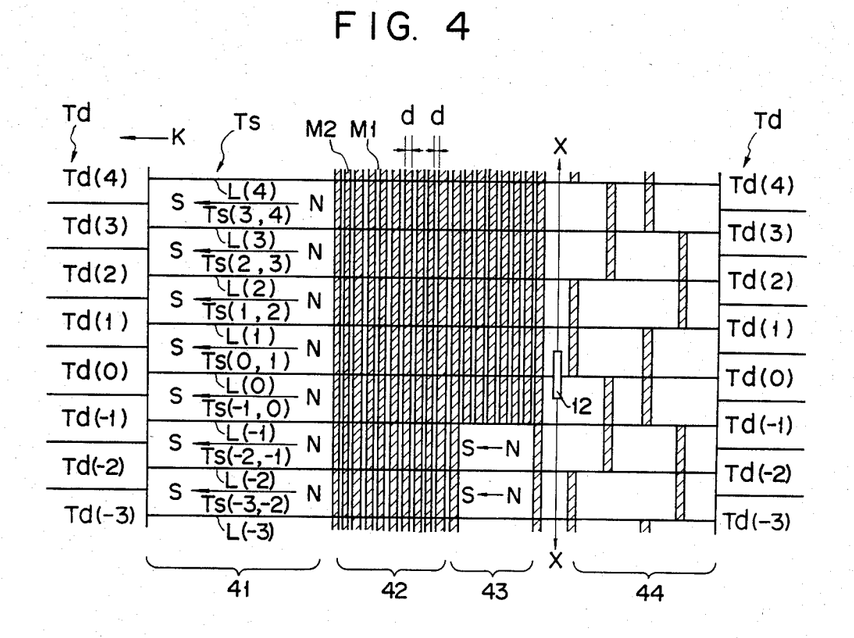
FIG. 4 is a view showing the detail of a servo sector of the magnetic disk shown in FIG. 3.

FIG. 4 is an enlarged view of a part of the outer peripheral portion of the servo sector 22 shown in FIG. 2. Since the view of FIG. 4 is enlarged to a very great extent, for convenience of explanation the servo track Ts and data track Td are shown in linear form. In FIG. 4, the data tracks Td are shown eight in number from Td(−3) to Td(4), while the servo tracks Ts are shown seven in number from T(−3,−2) to Ts(3,4). The border lines between the servo tracks are indicated by L(−3) to L(4). The magnetic head 12 moves in the radial direction (X—X indicated direction) of the magnetic disk.

As shown in FIG. 4, each one of the servo tracks Ts in the ERASE section 41 is magnetized on a direct current basis so that it may have an S pole on the left side and an N pole on the right side. Accordingly, even when the ERASE section 41 is allowed to pass below the magnetic head 12, no output signal is produced from the magnetic head 12. There is no other section than this ERASE section 41 in regard to which no output signal is obtained from the magnetic head 12 for a large length of time. Accordingly, if this no output signal region is detected, it is seen that the output signals from the AGC section 42, ZONE section 43 and PD section 44 will subsequently be obtained from the magnetic head 12. The switch circuit 16 shown in FIG. 1 receives the output signal of the AGC amplifier 15 and, when having detected the signal (i.e., the "no" signal) from the ERASE section 41, conducts its switching operation so that the output signal of the AGC amplifier 15 may be supplied to the servo circuit 17.

Figure 5:
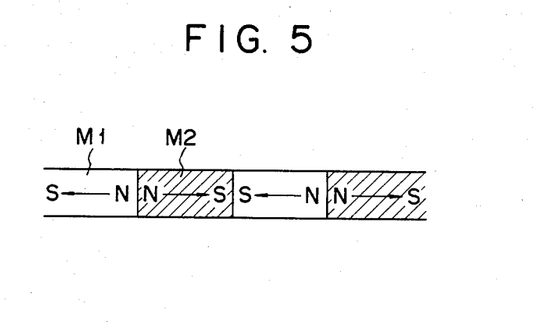
FIG. 5 is a view showing the direction in which the magnetized portion of FIG. 4 is magnetized.
Figure 6:
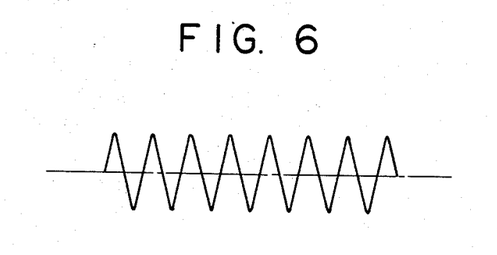
FIG. 6 shows an analog signal of constant frequency generated by the magnetic head when the magnetic head passes over the magnetized portions M1 and M2 of FIG. 5.

The AGC section 42 is provided, over an entire zone comprised of all servo tracks Ts, with magnetized portions M1 magnetized in the same direction as in said ERASE section 41 and having a specified width d, and magnetized portions M2 magnetized in the opposite direction and having the same width d, in such a manner that both said portions M1 and M2 are alternately disposed in side by side relation with each other. In FIG. 5, the magnetized portions M1 and the magnetized portions M2 are shown enlarged. In a normal operational state wherein the magnetic disk 10 is driven to rotate at a constant speed in the arrow K indicated direction, an analog signal of specified frequency is outputted from the magnetic head 12 as shown in FIG. 6. The AGC amplifier 15 has such an automatic gain control function as to produce an output signal of specified voltage level with respect to the signal read by the magnetic head 12 from any position of the magnetic disk 10. The AGC amplifier 15 performs its automatic gain control by using the analog signal of FIG. 6 read by the magnetic head 12 from the AGC section 42.

In the ZONE section 43, the servo tracks Ts located outside the servo tracks Ts($-2, -1$) and, though not shown, several servo tracks of the innermost peripheral side, are magnetized in the same manner as in said ERASE section 41. The remaining servo tracks Ts of this ZONE section 43 are magnetized in the same manner as in said AGC section 42. The portions of the ZONE section 43 magnetized in the same manner as in said ERASE section 41 are called a guard zone. The data tracks Td adjacent to this guard zone are not stored with data. Accordingly, when it has been detected from the output signal from the magnetic head 12 that the magnetic head is located within the guard zone, the servo circuit 17 and the servo control circuit 19 operate to move the magnetic head 12 further toward the inner or outer side from that current location so that the magnetic head 12 may be located on the data track Td stored with data.

Figure 7:
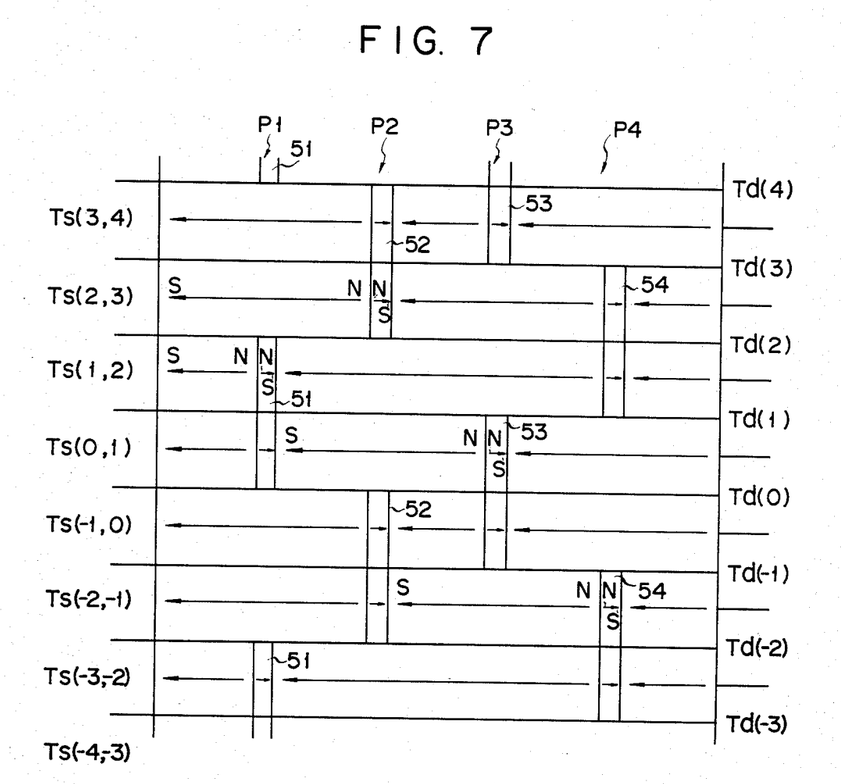
FIG. 7 shows an enlarged view of a portion of the position data sector of FIG. 4.

A part of the POSITION DATA section 44 is shown in FIG. 7 in enlarged form. Note here that since it is shown enlarged, each track takes a linear form. The PD section 44 is divided into five equal parts in the direction in which the magnetic disk 10 is driven to rotate, and the border lines between two adjacent parts are sequentially called first, second, third and fourth positions P1 to P4 from the left side of the FIG. 7 illustration. In the first position P1, there is a narrow region extending over a range of a two-track width of the servo track Ts(1,2) and servo track Ts(0,1) and magnetized from the left to the right of the illustration. This narrow region is called a magnetized unit region. In this first position P1, the magnetized unit regions 51 having a two-track width are disposed at space intervals of two tracks. In the second position P2, the magnetized unit regions 52 having a two-track width are disposed, at space intervals of two tracks, on the servo tracks having no magnetized unit regions 51 disposed thereon. In the case of the FIG. 7 illustration, the magnetized unit regions 52 are disposed in a two-track width zone comprised of the servo track Ts($-1,0$) and the servo track Ts($-2, -1$) and in a two-track width zone comprised of the servo track Ts(3,4) and the servo track Ts(2,3). In the third position P3, at the positions taken by displacement of their center positions by one track from the center positions of the magnetized unit regions 52, the magnetized unit regions 53 are disposed having a two-track width at space intervals of two tracks. In case of FIG. 7 illustration, the magnetized unit region 53 is shown disposed in a two-track width zone comprised of the servo track Ts(0,1) and servo track Ts($-1,0$). In the fourth position P4, the magnetized unit regions 54 having a two-track width are disposed, at space intervals of two tracks, at the positions taken by displacement of their center positions by one track from the center positions of the magnetized unit regions 52. In case of FIG. 7 illustration, the magnetized unit regions 54 are disposed at a position of two-track width zone comprised of the servo track Ts(2,3) and servo track Ts(1,2) and at a position of two-track width zone comprised of the servo track Ts($-2, -1$) and servo track Ts($-3, -2$), respectively.

In the PD section 44, other track portions than the magnetized unit regions 51 to 54 are magnetized from the right to the left. In FIG. 7, in the first position P1, the magnetized unit regions 51 are disposed; in the second position P2, the magnetized unit regions 52 are disposed; in the third position P3, the magnetized unit regions 53 are disposed; and in the fourth position P4, the magnetized unit regions 54 are disposed. According to this invention, however, the disposition of the magnetized unit regions is not limited to this arrangement only. That is, the magnetized unit region groups 51 to 54 may be disposed in any of the positions P1 to P4 if the magnetized unit region in one group is not disposed on the same track as that on which the magnetized unit region in another group is disposed.

When the magnetic disk 10 is allowed to rotate in the arrow K indicated direction of FIG. 4 and the PD section 44 of the servo sector 22 passes below the magnetic head 12, the magnetic head 12 produces an output signal due to the magnetic effect of the magnetized unit regions 51 to 54. When the left end of each magnetized unit region passes below the magnetic head 12, the direction of magnetization is inverted from the from-right-to-left direction to the from-left-to-right direction, with a result that an analog signal having a positive peak value is produced from the magnetic head 12. Further, when the right end of each magnetized unit region passes below the magnetic head 12, the direction of magnetization is inverted from the from-left-to-right direction to the from-right-to-left direction, with a result that an analog signal having a negative peak value is produced from the magnetic head 12.

As mentioned before, the core width of the magnetic head 12 is substantially equal to one-track width. When the magnetic disk 10 is allowed to rotate in the arrow K indicated direction of FIG. 3 and, in a state wherein the magnetic head 12 is to overlap in its entirety upon any one of the magnetized unit regions without having any mismatching portion with the same, this magnetized unit region passes below the magnetic head 12, the analog signal outputted from the magnetic head 12 has a maximal peak value P. When, in a state wherein a half of the magnetic head 12 is to overlap upon any one of the magnetized unit regions, this magnetized unit region passes below the magnetic head 12, the analog signal outputted from the magnetic head 12 has a peak value of P/2.

Figure 8:
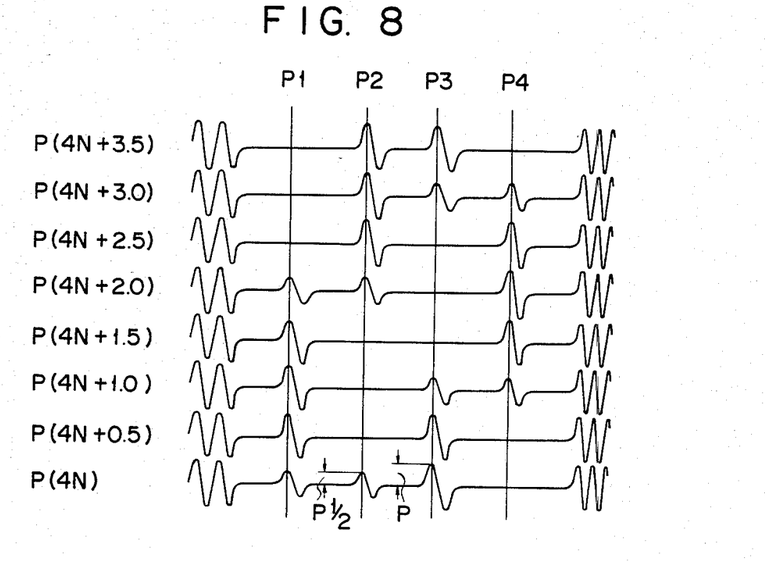
FIG. 8 is a view showing the position and magnitude of signals obtained at various magnetic head position of FIG. 7.

FIG. 8 shows the waveforms P of the output signals produced, when the magnetic head 12 is moved, from the magnetic head 12 at various positions thereof. The waveform P(4N) is the signal read by the magnetic head 12 from the data track Td located in the 4Nth (N is an integer) order or position when the data tracks Td (excluding those coming within the guard zone) are counted, with the outermost peripheral data track set as 0, sequentially from this 0th data track toward the center of the magnetic disk 10. The waveform P(4N+0.5) is obtained from the magnetic head 12 when the same is located at an intermediate position between the said 4Nth data track and the (4N+1)th data track, that is, when the magnetic head 12 is moved from the 4Nth data track toward the center, by the amount of movement equal to 0.5 track width. Similarly, the waveforms P(4N+1.0), P(4N+1.5), P(4N+2), P(4N+2.5), P(4N+3) and P(4N+3.5) are the signals obtained, when the magnetic head 12 is sequentially moved by each 0.5 track width from the (4N+0.5) waveform position toward the center, from the magnetic head 12 at these various positions. The waveform P(4N) is obtained when the magnetic head 12 is located on the data track Td(0) shown in FIG. 7. That is to say, when the magnetic disk 10 is allowed to rotate in the arrow K indicated direction with the magnetic head 12 located on the data track Td(0), a lower half of the magnetized unit region 51 in the first position P1 passes below the corresponding half of the core of the magnetic head 12. Further, an upper half of the magnetized unit region 52 in the second position P2 passes below the corresponding half of the core of the magnetic head 12. Accordingly, as shown in FIG. 8, the waveforms having a peak value of P/2 are obtained from the positions P1 and P2. Further, in the third position P3, the magnetized unit region 53 passes below the core of the magnetic head 12 throughout the entire width thereof, with a result that, as shown in FIG. 8, the waveform having a peak value of P is obtained from the magnetic head 12. Further, in the fourth position P4, the magnetized unit region 54 does not pass below any portion of the magnetic head core, with a result that no output is produced from the magnetic head 12 in regard to this fourth position. The other waveforms P(4N+0.5) to P(4N+3.5) will be understood in the same manner as mentioned above.

There will now be described an embodiment of the servo circuit causing movement of the magnetic head by using the magnetic disk having the servo track configuration.

Figure 9:
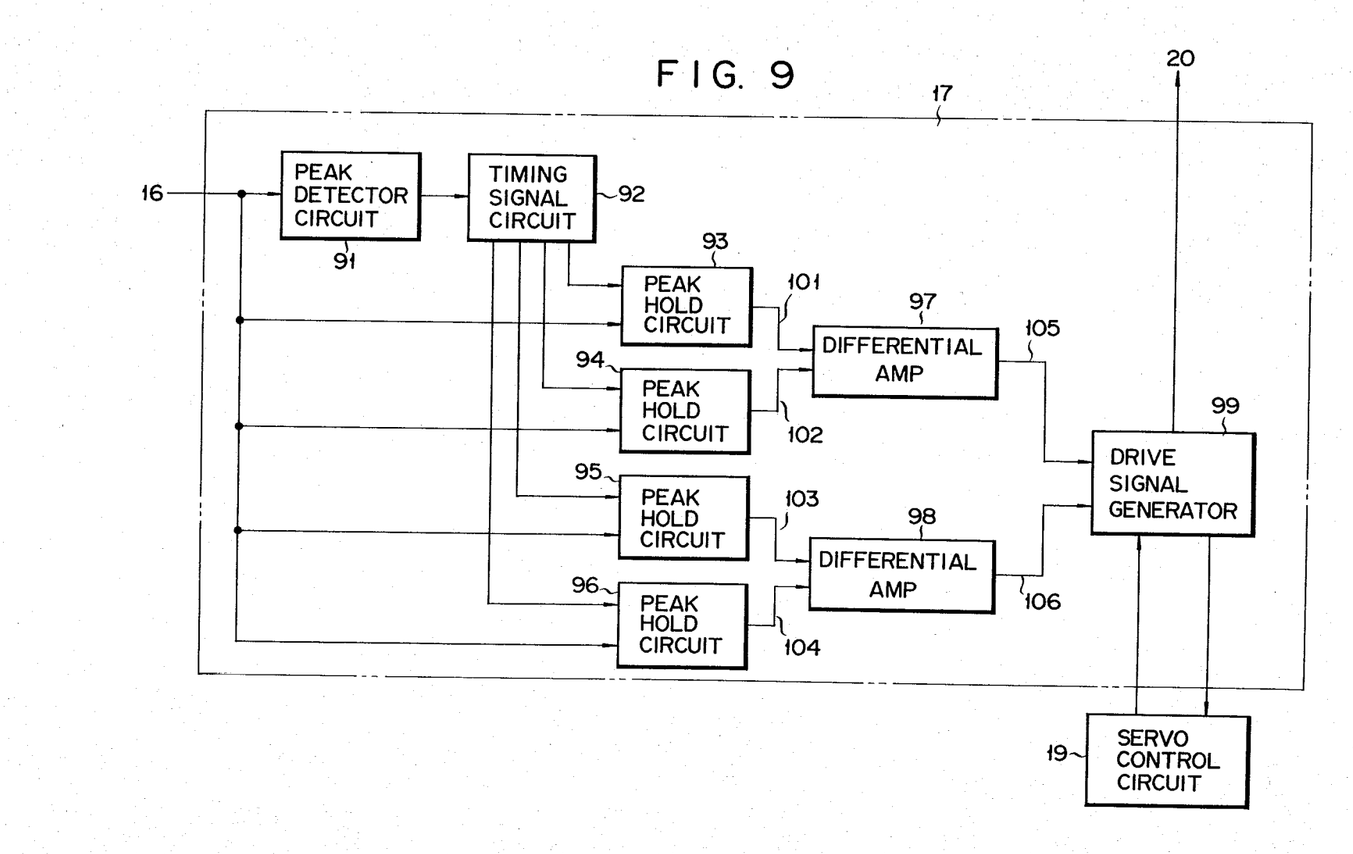
FIG. 9 is a block diagram for explaining the detail of a servo circuit shown in FIG. 1.
Figure 10:
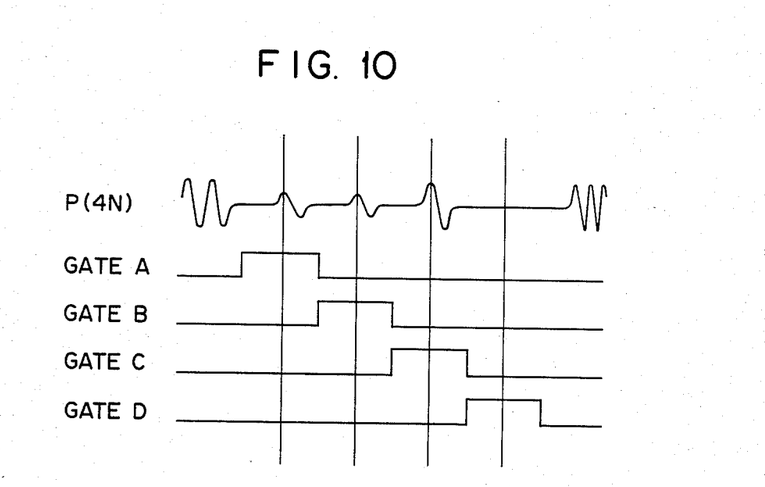
FIG. 10 shows the positions of a gate signal for drawing out the signals of FIG. 8.

FIG. 9 is a block circuit diagram showing a detailed construction of the servo circuit 17 shown in FIG. 1. A peak detection circuit 91 detects the peak of the signal shown in FIG. 6 sent through the AGC amplifier 15 and the switch circuit 16 and produces a pulse signal of specified pulse width to a timing signal generation circuit 92. In the timing signal generation circuit 92, pulse signals synchronized with the periodic cycle of the pulse signals produced from the peak detection circuit 91 are prepared by using a phase locked loop. These pulse signals are sequentially supplied to the corresponding peak hold circuits A93 to D96 by being sequentially diverted by a counter circuit. The pulse signal outputted from the timing signal generation circuit 92 to the peak hold circuit A93 is called a GATE signal A. Similarly given are GATE signal B, GATE signal C, and GATE signal D. Each peak hold circuit holds the peak value of the output signal of the magnetic head 12 applied from the switch circuit 16, with a timing of the corresponding GATE signal applied from the timing signal generation circuit 92 (FIG. 10).

Figure 11A:
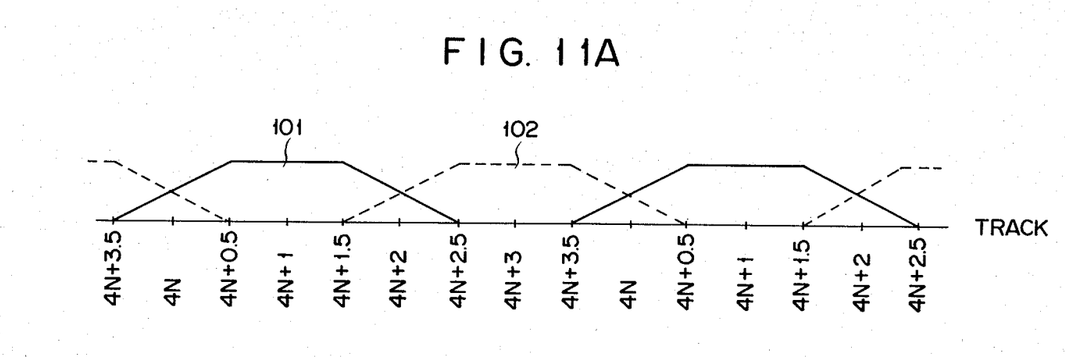
FIG. 11A shows the variation in positive peak values of two types of signals obtained by moving the magnetic head.
Figure 11B:
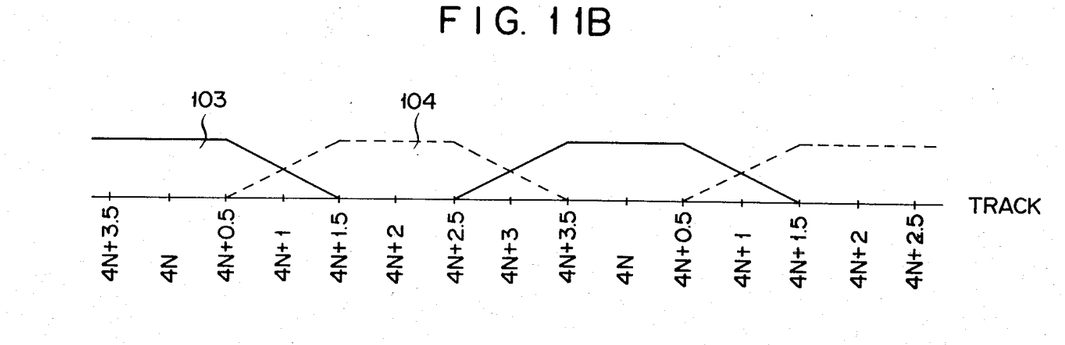
FIG. 11B shows the variation in positive peak value of two other types of signals obtained by moving the magnetic head.
Figure 12A:
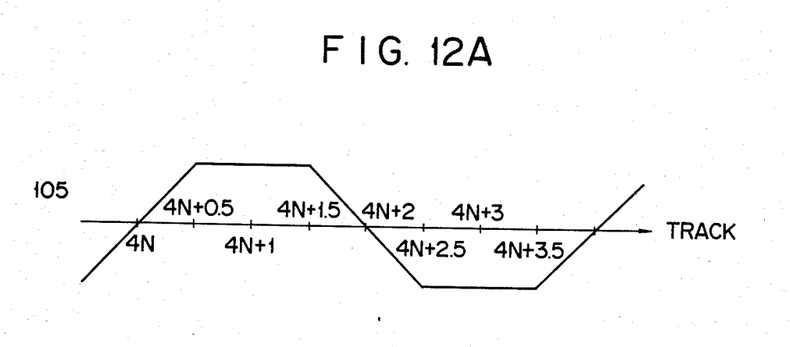
FIG. 12A shows a difference value between the peak values of the two types of signals in FIG. 11A.
Figure 12B:
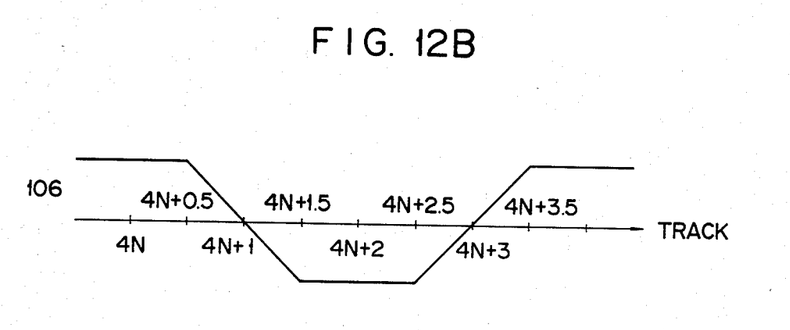
FIG. 12B shows a difference value between the peak values of signals shown in FIG. 11A.

FIG. 11A is a graphic diagram having track positions plotted on the abscissa and voltage values plotted on the ordinate. The waveform 101 is prepared by continuous illustration of the voltage values held by the peak hold circuit A93. The waveform 102 is prepared by continuous illustration of the voltage values held by the peak hold circuit B94. In FIG. 11B, the waveform 103 is prepared by continuous illustration of the voltage values held by the peak hold circuit C95. And the waveform 104 is prepared by continuous illustration of the voltage values held by the peak hold circuit D96. A differential amplifier 97 determines the difference between the output of the peak hold circuit A93 and the output of the peak hold circuit B94 to produce a difference value signal. This difference signal is shown in FIG. 12A by a reference numeral 105. A differential amplifier 98 determines the difference between the output of the peak hold circuit C95 and the output of the peak hold circuit D96 to produce a difference value signal. This output difference signal is shown in FIG. 12B by a reference numeral 106. A drive signal generator 99 receives the output signal 105 of the differential amplifier 97 and the output signal 106 of the differential amplifier 98 to detect the current position of the magnetic head. That is to say, the output signal 105 and the output signal 106 form a two-phase signal of cyclic 4-track period. That is, these two signals do not have the same voltage level at any position of 4N track to 4N+3.5 track. By detecting a combination of the voltage level differences between those two signals, therefore, it can be easily detected above which track the magnetic head 12 is currently located. The drive signal generator 99, using the output signals 105 and 106, detects the crossing of the magnetic head 12 over a track, and supplies the above-mentioned cylinder pulse to the servo control circuit 19. As stated before, the servo control circuit 19 can detect, by receiving this cylinder pulse, how many tracks should be passed over until a desired track is reached by the magnetic head. Therefore, the servo control circuit 19 sends to the drive signal generator 99 an instruction signal for causing a further movement of the magnetic head. The drive signal generator 99, upon receipt of this instruction, supplies a necessary drive current to the linear motor 20 to drive the same.

Refer again to FIG. 12. Assume for example a certain servo sector 22 has passed below the magnetic head 12, and the magnetic head 12 is located on the (4N+0.5) track. Assume further that the magnetic head 12 has moved to (4N+3.5) track by the time the next servo sector 22 passes below the magnetic head 12. At this time, while no variation occurs in the magnitude of the voltage value of the output signal 106, a variation of the signal from positive maximum to negative maximum occurs in the voltage value of the output signal 105. By detecting the variation in such voltage value, it is possible to know precisely the number of tracks passed over by the magnetic head.

As have been made clear from the foregoing explanation, the use of the servo track configuration of the invention permits such two types of signals as shown in FIG. 12 to be obtained. And the use of these two types of signals enables the precise current position of the magnetic head to be confirmed during the passing of the data sector below the magnetic head if the amount of movement of the magnetic head falls within the range of four tracks at maximum.

What is claimed is:

1. A method of accurately determining the position of a magnetic head relative to a magnetic disk comprising the steps of:
   dividing said magnetic disk inot alternating data sectors and servo sectors;
   sub-dividing said servo sectors into servo tracks of individual width substantially equivalent to the width of said magnetic head;
   establishing within each servo sector staggered non-repeating magnetized unit regions each of which has a width twice that of one of said servo tracks;
   obtaining peak value signals from said magnetized unit regions during relative movement of said head and disk; and
   analyzing said peak value signals to obtain a position determining signal which is a two-phase signal having a cyclic 4-track period to thereby determine the position of said magnetic head within a given servo sector.

2. A magnetic disk apparatus, comprising:
   a magnetic disk rotatable about an axis of said disk, having data sectors and servo sectors alternatively defined thereon, each of said sectors having a plurality of tracks, and each one of said servo sectors having a plurality of magnetized unit regions each with widths equivalent to two of said servo tracks, said magnetized unit regions being formed in four predetermined positions on said servo tracks at prescribed space intervals and being arranged such that no two magnetized unit regions cover the same pair of adjacent servo tracks within any one of said servo sectors;
   magnetic head means for reading information from said servo sectors and data sectors and for producing output signals indicative thereof, said magnetic head means being radially movable relative to said rotatable axis of said magnetic disk, and having a width substantially equal to the width of one of said servo tracks; and
   servo circuit means, receiving said output signals from said magnetic head means, for producing a position signal indicating the radial position of said magnetic head means relative to said magnetic disk, which position signal is a two-phase signal having a cyclic 4-track period.

3. A magnetic disk apparatus as in claim 2, wherein said servo circuit means includes four peak hold circuits, each of which is uniquely associated with one of said received signals from said magnetic head means, and two differential amplifers for comparing paired outputs of said peak hold circuits.

4. A magnetic disk apparatus as in claim 3, wherein said servo circuit means further includes a linear motor for controllably positioning said magnetic head means, and drive signal generator means, responsive to outputs of said differential amplifiers and a control input, for controlling said linear motor.

* * * * *